Jan. 12, 1965     H. L. DUNLAP     3,165,074
DOORWAY CONSTRUCTION
Original Filed June 11, 1956     10 Sheets-Sheet 3
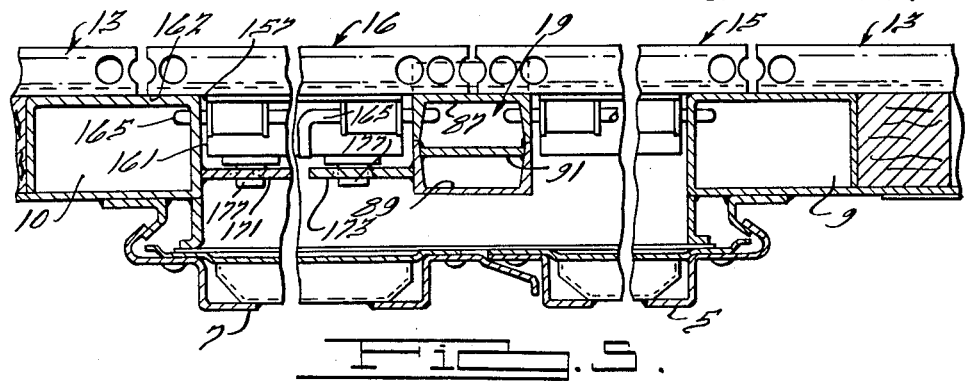
FIG. 5.
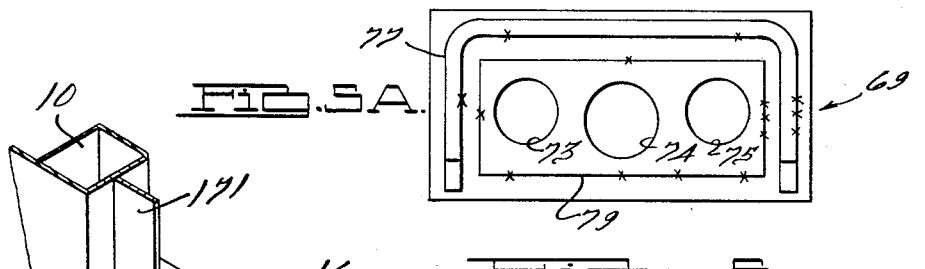
FIG. 5A.
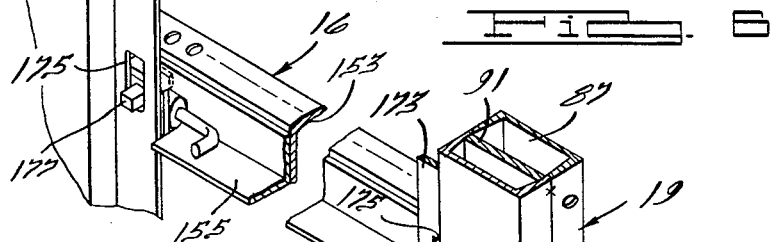
FIG. 6.
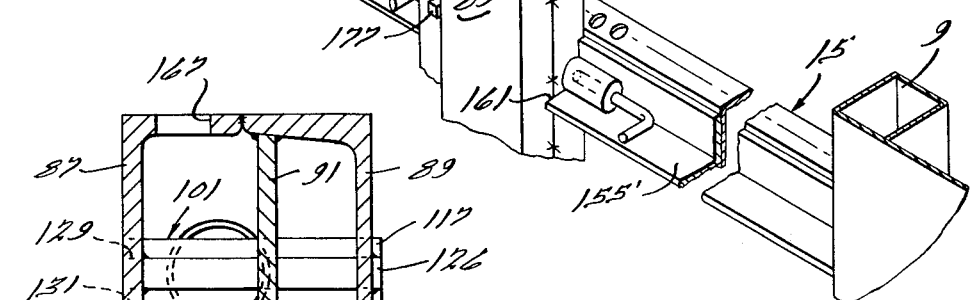
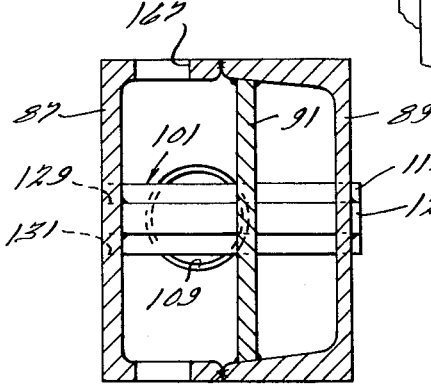
FIG. 8.
INVENTOR.
Henry L. Dunlap
BY
Harness, Dickey & Pierce
ATTORNEYS

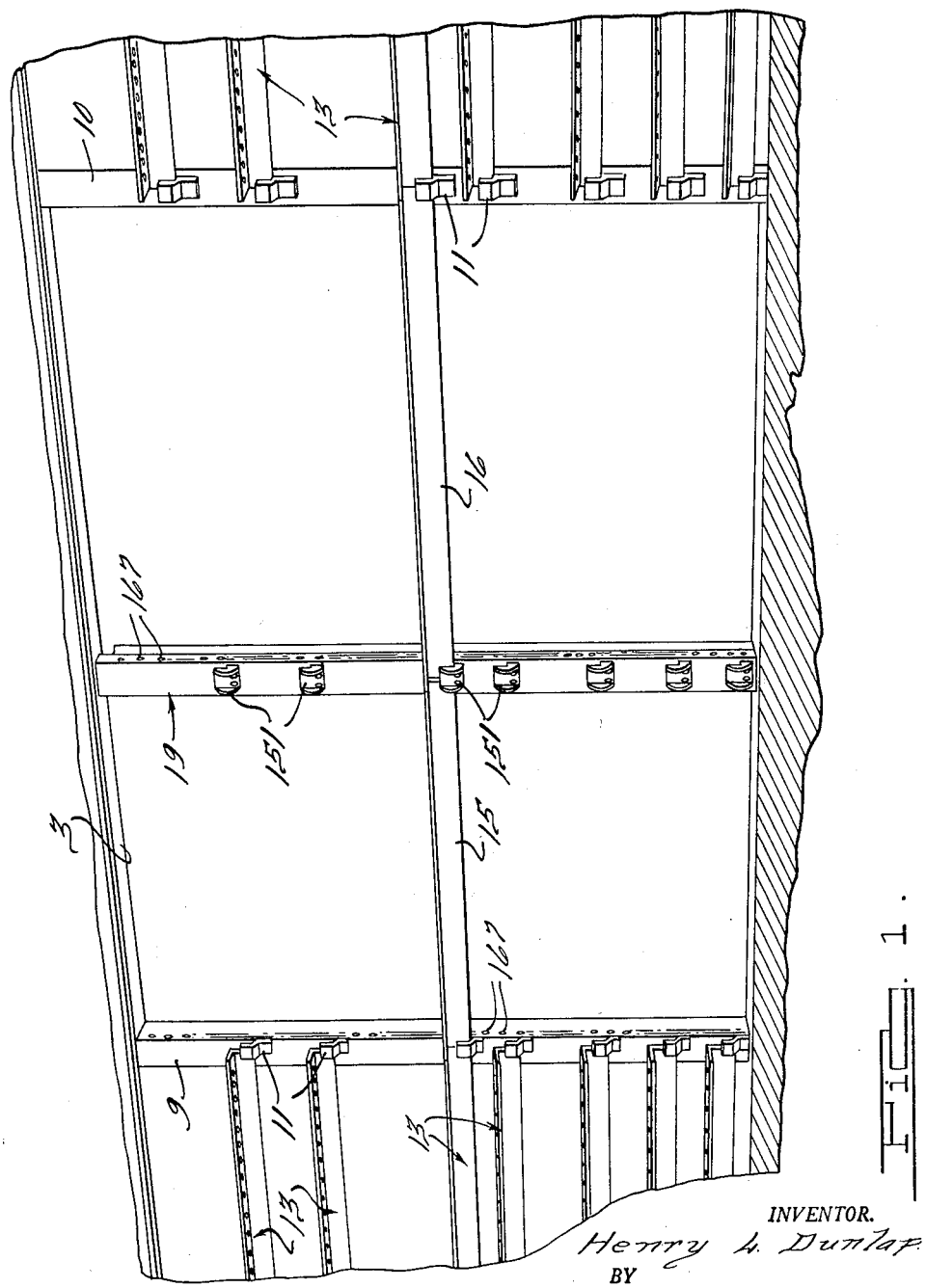

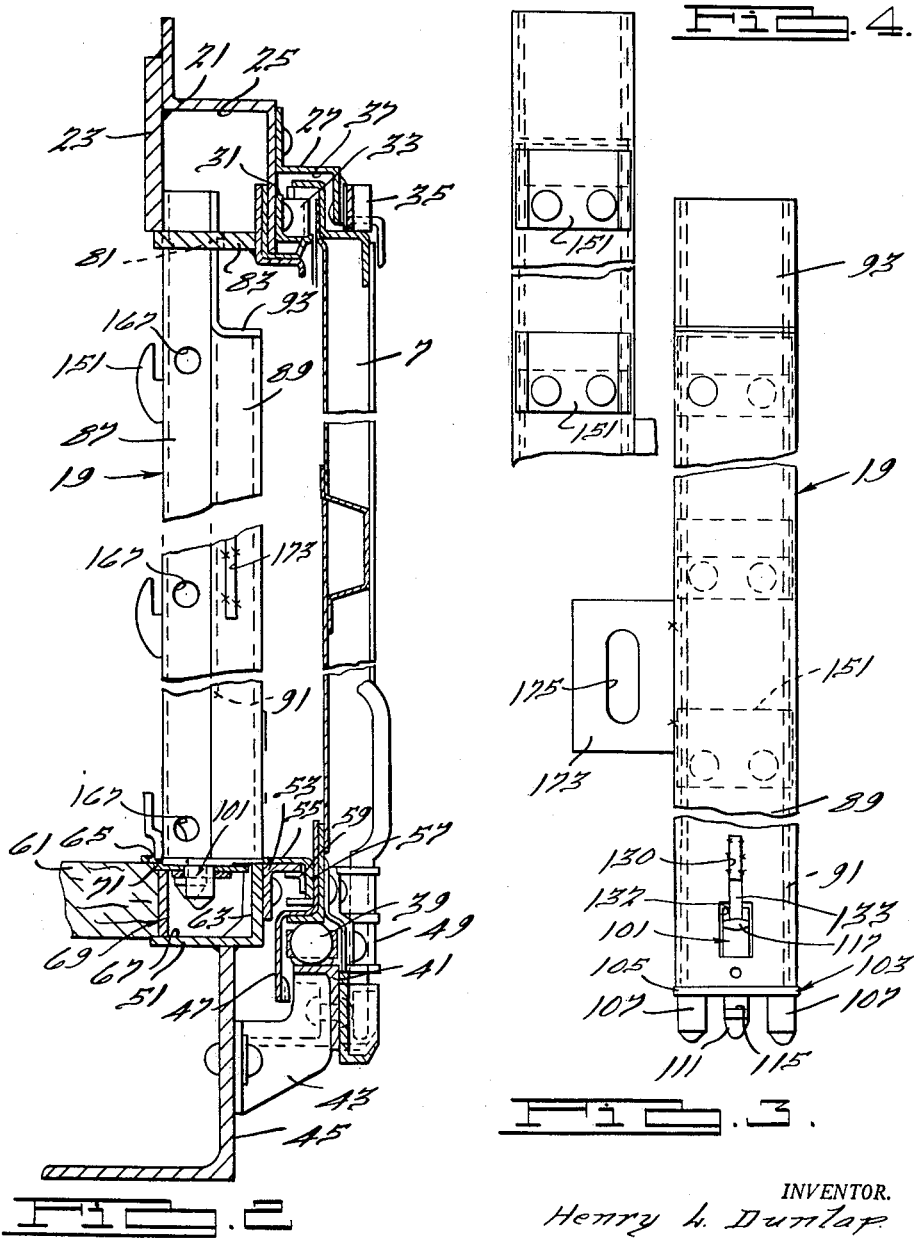

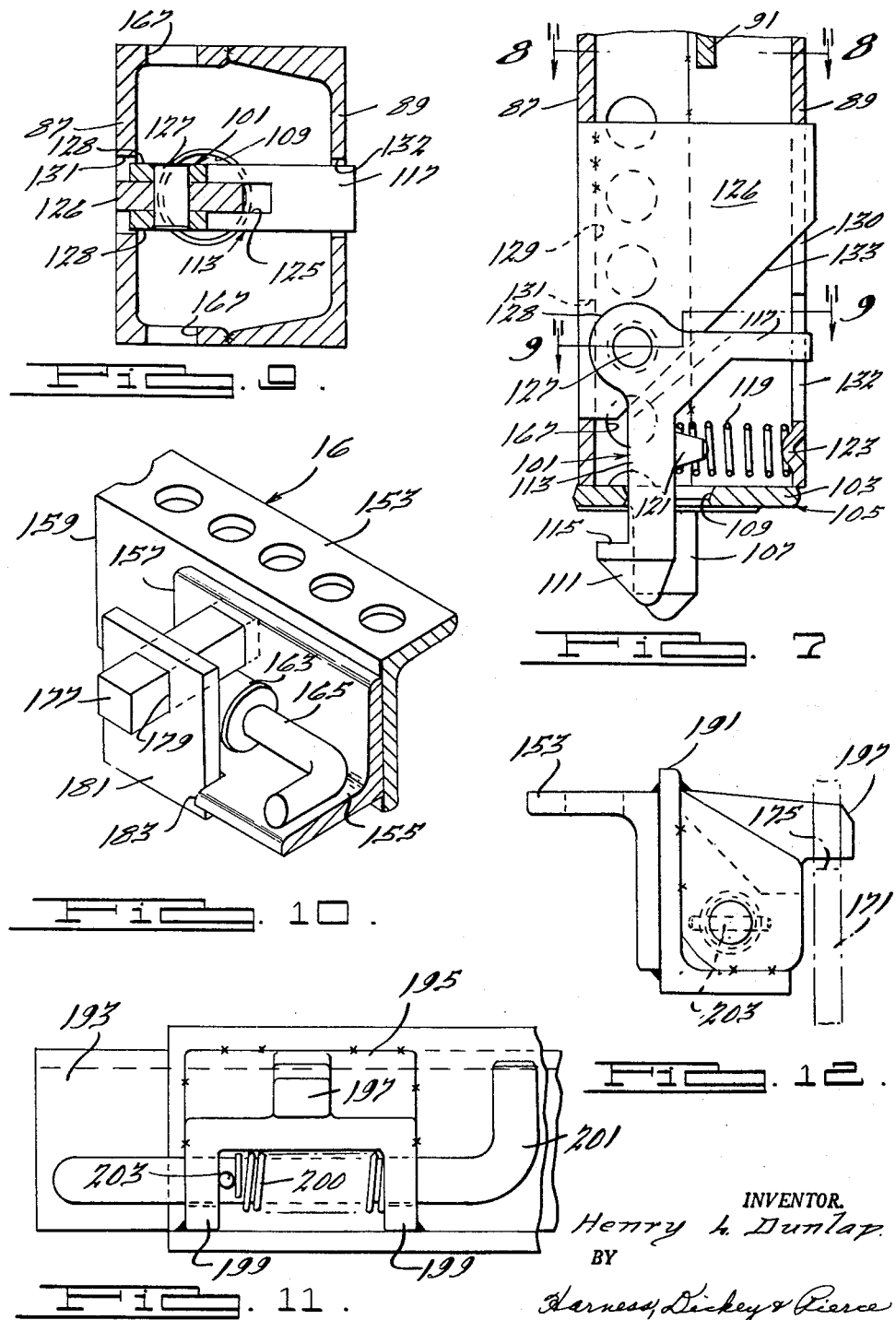

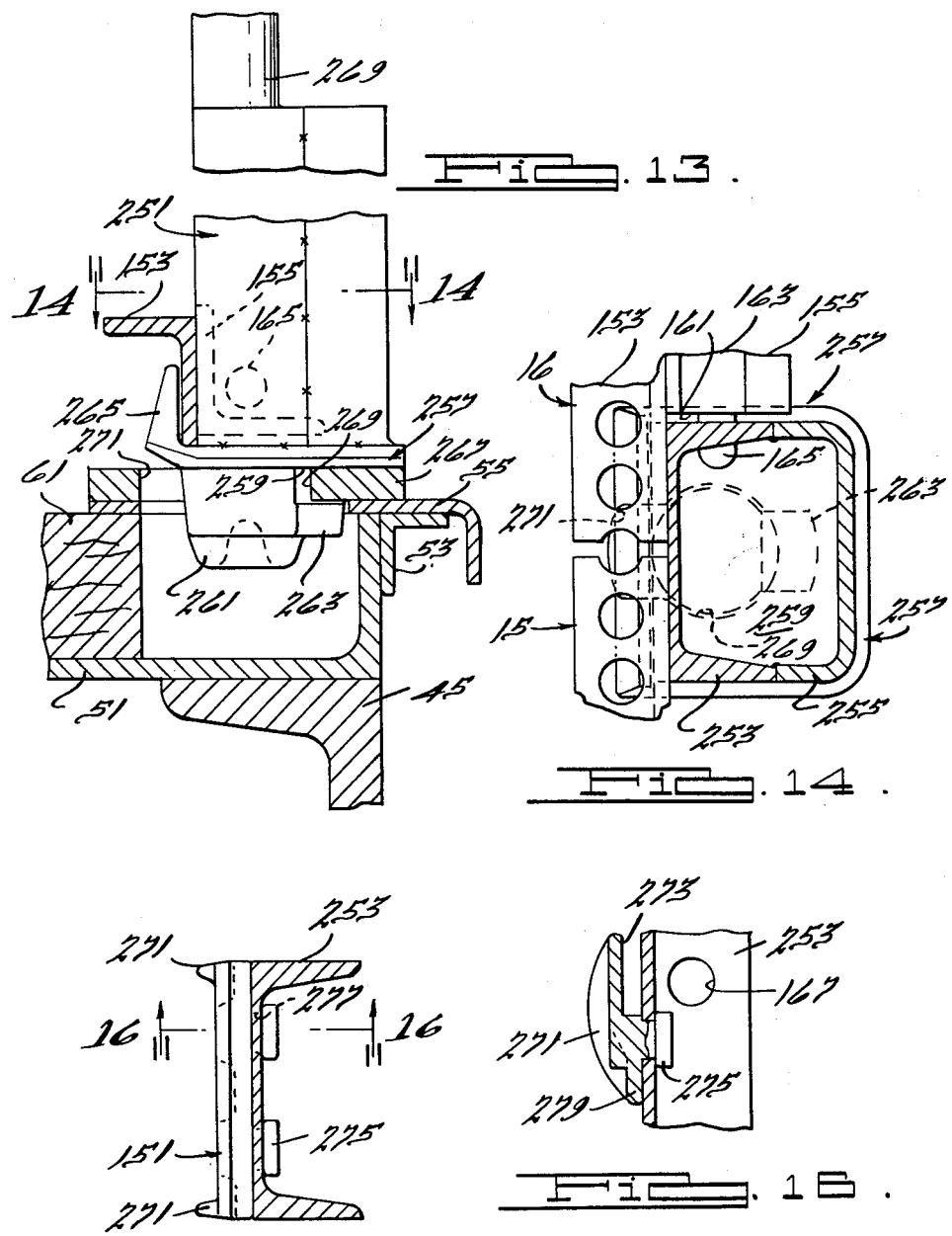

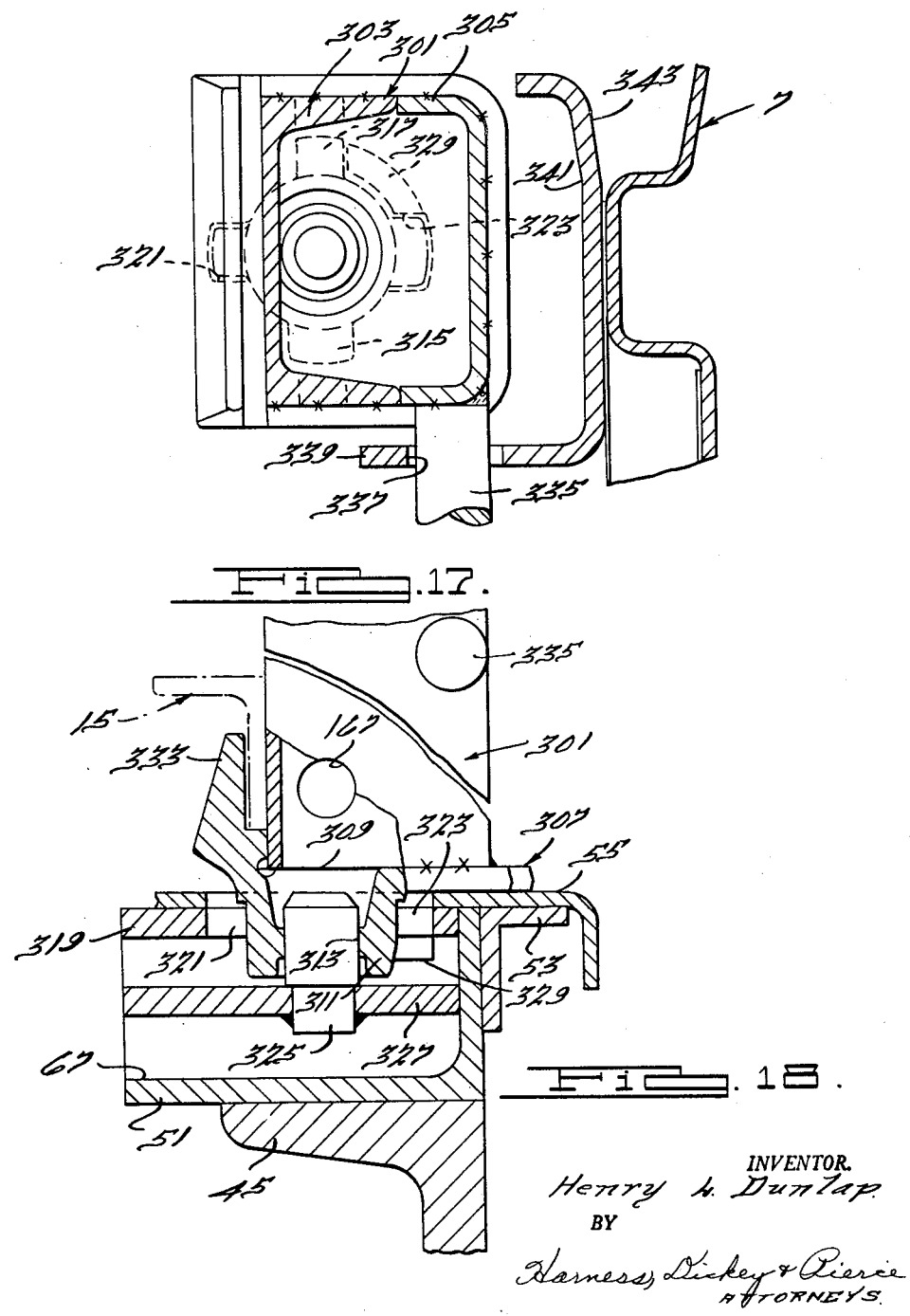

Jan. 12, 1965     H. L. DUNLAP     3,165,074
DOORWAY CONSTRUCTION
Original Filed June 11, 1956     10 Sheets-Sheet 7
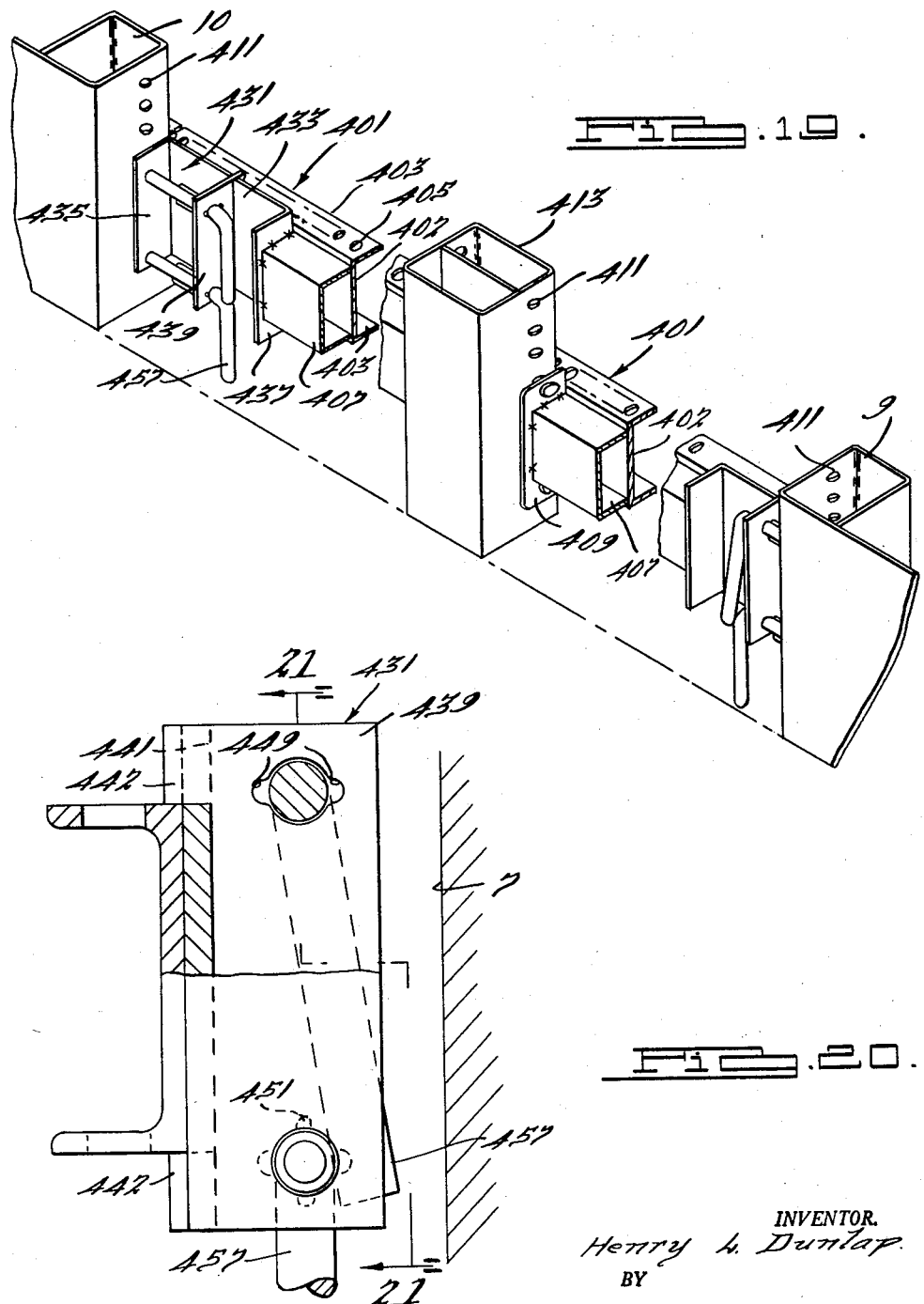
INVENTOR.
Henry L. Dunlap
BY
Harness, Dickey & Pierce
ATTORNEYS.

INVENTOR.
Henry L. Dunlap
BY
Harness, Dickey & Pierce
ATTORNEYS

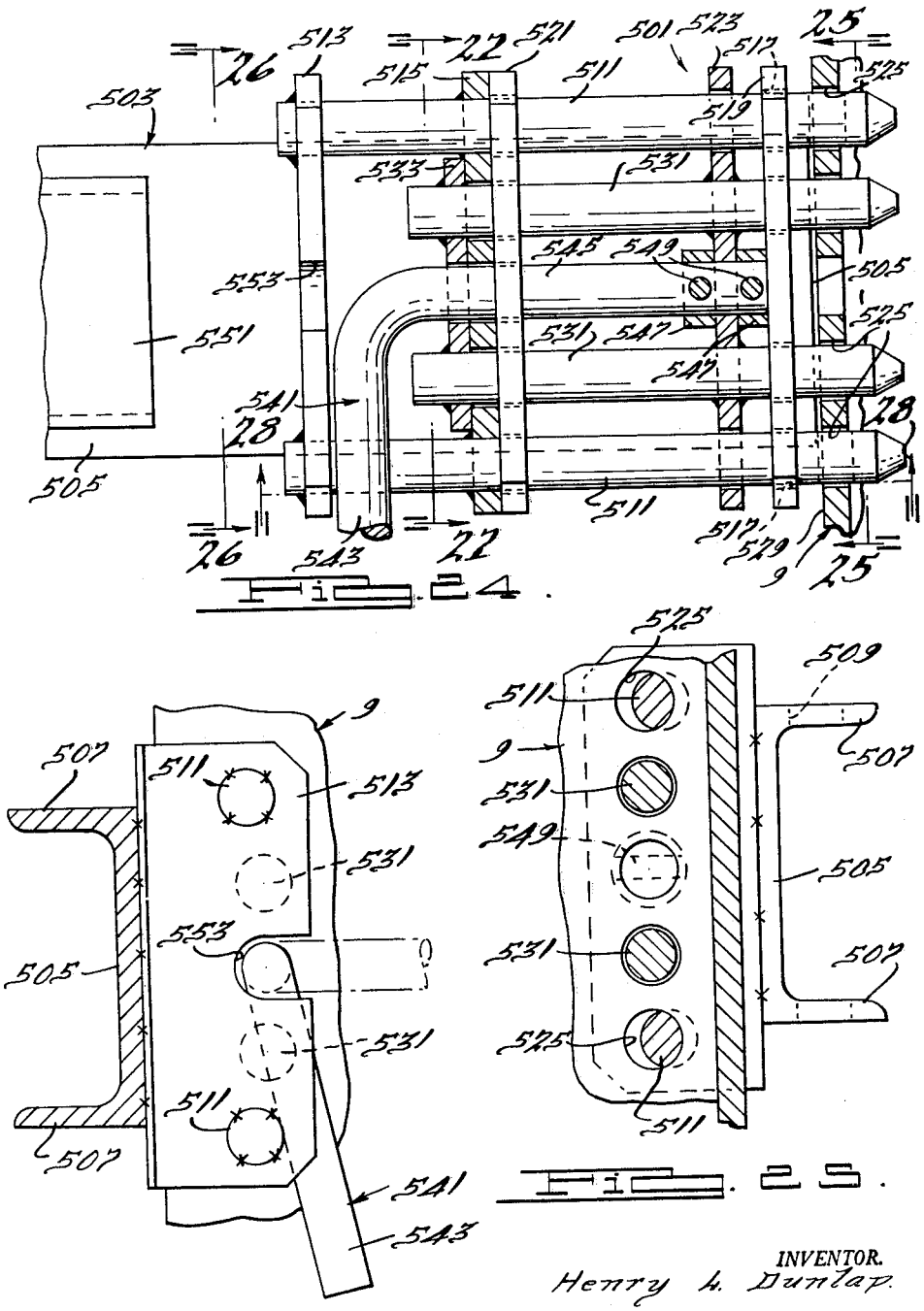

Jan. 12, 1965       H. L. DUNLAP       3,165,074
DOORWAY CONSTRUCTION
Original Filed June 11, 1956       10 Sheets—Sheet 10

INVENTOR.
Henry L. Dunlap
BY
Harness, Dickey & Pierce
ATTORNEYS.

United States Patent Office 3,165,074
Patented Jan. 12, 1965

3,165,074
DOORWAY CONSTRUCTION
Henry L. Dunlap, Dearborn, Mich., assignor to Evans Products Company, Plymouth, Mich., a corporation of Delaware
Original application June 11, 1956, Ser. No. 590,532, now Patent No. 2,994,285, dated Aug. 1, 1961. Divided and this application Oct. 27, 1960, Ser. No. 65,345
7 Claims. (Cl. 105—369)

The present invention relates to freight storage apparatus and in particular, to removable elements constituting a part of a freight storage apparatus, and is a divisional application of co-pending application Serial No. 590,532 filed June 11, 1956, now Patent No. 2,994,285 issued August 1, 1961. Though not exclusively adapted to such application, the present invention is of particular value in connection with the doorway construction of railroad cars.

As is well known, it has become common practice in the shipment of freight by railroad cars, and by other vehicles, to employ dunnage or freight supporting equipment to protect the articles being shipped against damage incident to the motion of the transporting vehicle. This equipment should be designed so that it can be easily handled and so that it can be readily inserted in place after the conveyance has been loaded with the goods to be shipped. It will be realized that in the case of conveyances having loading doors at the end, such as is common in trucks, the design of freight bracing equipment is somewhat simplified as compared with the design of equipment for a typical railroad boxcar in which the doorways are provided on either side at an intermediate point in the car.

In order to make full use of a freight car having side doorways and still support all of the freight carried within the car, it is necessary to provide some type of removable freight storage equipment that will span the doorway and serve, in effect, as a rigid but removable, side wall frame. The equipment used for such purposes must be designed so that it can be readily associated with the other freight supporting means within the boxcar; it must be light enough to be readily handled manually and yet strong enough to withstand the very substantial loads that might be placed upon it during the shipment of freight, as well as exceptional abuse to which it may be subjected in the course of its usage; and it must also be of such a design that it can be readily manufactured at an acceptable cost.

The problem of providing suitable freight bracing doorway constructions is considerably aggravated in the case of boxcars which have auxiliary doors in addition to the main doors. Experience has shown that the conventional eight foot main door in each side of a boxcar is not large enough to permit easy loading of large articles of freight, such as automobile bodies or articles stowed on racks or pallets; and, as a consequence, many boxcars are provided with auxiliary doors which add another seven or eight feet to the width of the doorways. The main doors are ordinarily opposite to each other while the auxiliary doors are ordinarily on the left-hand side of the main door in viewing the freight car from the outside, so that in boxcars having these doors there may be as many as twenty-four feet of the length of the car occupied by doorways, and for which provision must be made for removable elements to brace freight within the car. The aggravating factor of the double doorway is the long span, i.e., fifteen or sixteen feet, that must be covered by a wall member which in turn will support cross members that extend across the width of the freight car and engage the freight. Since the loads placed by the freight on the cross members will be transferred into the wall members, the latter must be quite strong; and where they are as long as fifteen or sixteen feet in length, their size and weight becomes so great that they cannot be handled by a single man. The solution to this problem has been to support the wall member at an intermediate point along its length or to use two aligned wall members supported between the sides of the doorway and which have a combined length sufficient to span the doorway. In either case, the intermediate support has been provided by a post located in the doorway and arranged to be removable so that the full width of the doorway can be used to load or unload the boxcar. One such doorpost is shown in a patent of applicant's co-worker, S. M. Nampa, No. 2,613,615 of October 14, 1952 and assigned to the assignee hereof. The present invention constitutes an improvement upon the door structure disclosed in that patent and, though it is by no means so limited, it is illustrated for use with the particular types of freight bracing equipment shown in Patent No. 2,725,826 of December 6, 1955 and assigned to the assignee hereof.

In addition to the problem of providing adequate strength in doorway members that are light enough to be handled by one person, removable freight bracing constructions raise the problem of latching the various members to each other and to fixed parts of the freight car. The latching must be done in such a way as to accommodate very substantial dimensional variations from one boxcar to another so that the doorway members will be interchangeable. It also must be accomplished in such a way that substantial deflections of the connected members or of the door frame itself during use of the boxcar will not cause disengagement with consequent release of the load. And, furthermore, the latching must be done in such a way that the members can be inserted in their proper position after the freight car has been fully loaded and removed from such position before the car is unloaded. In order to obtain maximum benefit of the boxcar in this connection, it is desirable that the latching means be arranged so that they can be operated from the outside of the freight car after the doors have been slid to an open position. The present invention provides a doorway construction embodying satisfactory solutions to these various problems.

It is thus the general object of the present invention to provide an improved type of removable equipment for bracing freight.

Another object of the present invention is to provide freight bracing equipment for the doorway of a railroad boxcar.

Another object of the present invention is to provide freight bracing equipment for a double door boxcar in which the component parts are light enough to be easily handled by one person but which, when combined in the prescribed manner with the other components, are strong enough to withstand the loads placed upon them in usage.

A further object of the present invention is to provide an improved doorway wall member for extending horizontally across the width of the doorway in a railroad boxcar.

Another object of the present invention is to provide an improved removable post to extend vertically throughout the height of the doorway in a boxcar and serve as a support for doorway wall members.

Another object is to provide a freight bracing doorway construction which is designed to prevent bending of the removable doorposts.

An additional object is to provide a freight bracing doorway construction for boxcars in which the doorway wall members are used to brace the removable doorpost or are arranged to transfer all fore and aft loads thereon to fixed posts at the sides of the doorway.

An additional object is to provide a freight bracing doorway construction for boxcars having a removable doorpost for supporting doorway wall members in which a door is used to take loads on the post.

An additional object is to provide an improved type of removable doorpost which can be readily operated from the outside of the boxcar.

A further object is to provide a removable doorpost for the doorway of boxcars which has no moving parts.

A further object is to provide a removable doorpost for boxcars embodying means which insure its proper positioning.

A further object is to provide a rotatable type of removable doorpost for freight bracing doorway constructions of boxcars in which the wall members act to prevent undesired rotation thereof.

A further object is to provide an improved doorway wall member for the doorway constructions of boxcars in which the latch means for the wall member is operative from the outside of a freight car.

A further object is to provide a doorway wall member for boxcars in which the latching means for holding it in position are locked in an operative position through the medium of the boxcar doors when the latter are closed.

Another object is to provide a component of a freight bracing doorway construction of such a nature that the doors cannot be closed unless the component is in proper position.

Various other objects and features of the invention will appear upon consideration of the accompanying drawings in which:

FIGURE 1 is a fragmentary perspective view, somewhat diagrammatic, taken from the inside of a boxcar looking out through a double doorway in which the door members have been mounted;

FIGURE 2 is a vertical cross section taken through a part of the doorway with parts broken away and parts removed;

FIGURE 3 is a side elevation of an improved doorpost of the type used in FIGURE 2, and shows this doorpost as it would appear from the outside of the car;

FIGURE 4 is a fragmentary side elevation of the post of FIGURES 2 and 3 as viewed from the inside of the car;

FIGURE 5 is a horizontal cross section through the doorway and fixed doorposts of FIGURE 2;

FIGURE 5A is a bottom plan view of the threshold box;

FIGURE 6 is a perspective view taken from the outside of a freight car and looking in through the doorway and showing a portion of the doorpost of the preceding figures along with certain types of wall members;

FIGURE 7 is a side elevation with parts removed of the latching mechanism used as the bottom of the doorpost of the preceding figures;

FIGURE 8 is a cross section on line 8—8 of FIGURE 7;

FIGURE 9 is a cross section on line 9—9 of FIGURE 7;

FIGURE 10 is a perspective view of one end of a wall member which has means embodied therein for furnishing support to a movable doorpost;

FIGURE 11 is a side view taken from the rear of a wall member similar to the one in FIGURE 10, but showing a different type of support mechanism;

FIGURE 12 is a side elevation taken from the left of FIGURE 11;

FIGURE 13 is a vertical section through the socket for the bottom of a different form of removable doorpost;

FIGURE 14 is a cross section taken along line 14—14 of FIGURE 13;

FIGURE 15 is a partial cross section showing the rail support clip on the post of FIGURES 13 and 14;

FIGURE 16 is a cross section taken along the line 16—16 of FIGURE 15;

FIGURE 17 is a horizontal cross section through a different form of doorpost which is connected to the auxiliary door;

FIGURE 18 is a vertical section similar to FIGURE 13 of the doorpost of FIGURE 1;

FIGURE 19 is a perspective view taken from the outside of a freight car looking in through the doorway and showing a different type of wall member;

FIGURE 20 is an enlarged view partly in section through one end of the wall member of FIGURE 19;

FIGURE 24 is a side elevation of a different form of attaching means for a wall member of the type shown in FIGURE 19;

FIGURE 25 is a cross section taken along the line 25—25 of FIGURE 24;

FIGURE 26 is a cross section taken along the line 26—26 of FIGURE 24;

Figure 21:
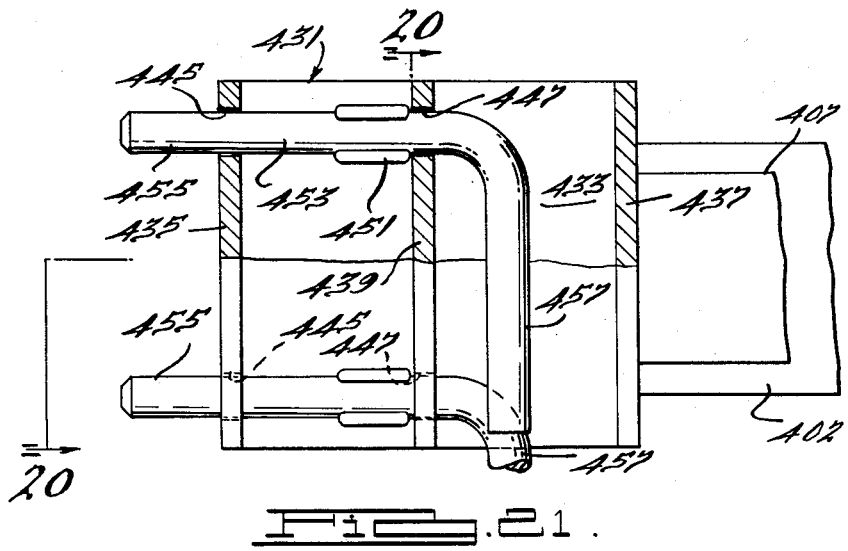
FIGURE 21 is a section along line 21—21 of FIGURE 20.
Figure 22:
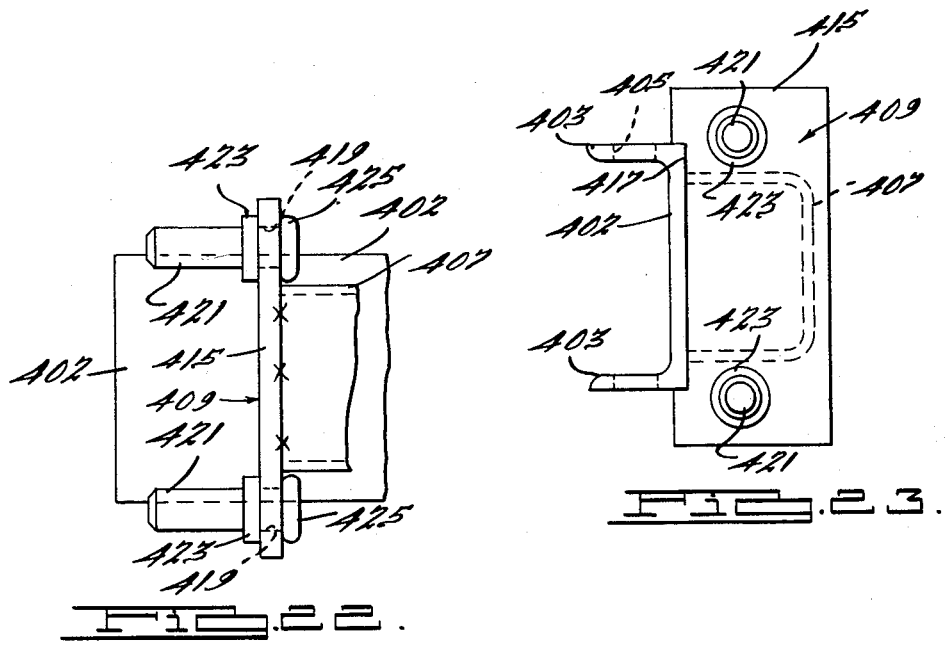
FIGURE 22 is a broken away side elevation of the fixed attachment means at the other end of the wall member of FIGURES 19 and 20.
Figure 23:
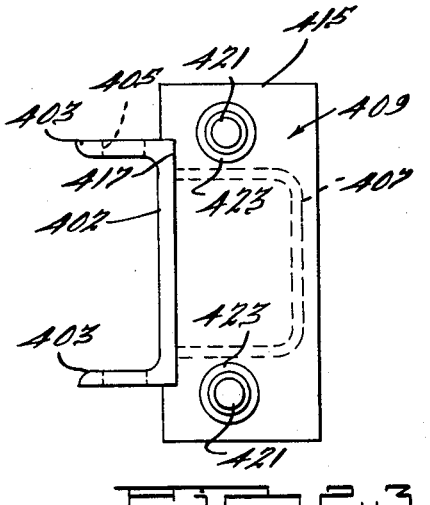
FIGURE 23 is a side elevation of the structure shown in FIGURE 21.
Figure 27:
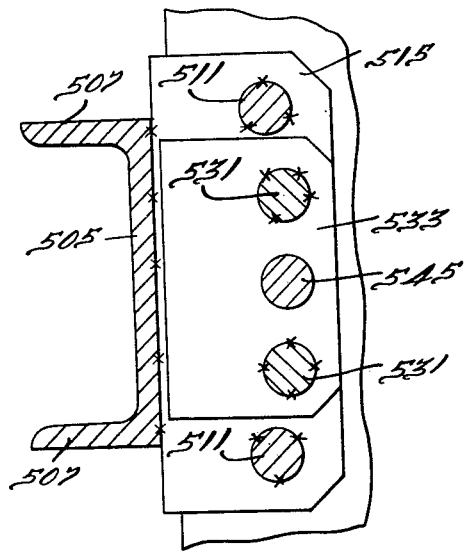
FIGURE 27 is a cross section taken along the line 27—27 of FIGURE 24.

Referring first to the invention shown in FIGURES 1 to 5, FIGURE 1 is a somewhat schematic view taken from the inside of a boxcar looking out through a doorway opening 3 which is wide enough to accommodate both the main door 5 and an auxiliary door 7 (FIGURE 5). At opposite sides of the doorway 3 are fixed vertical hollow posts 9 and 10 which are built up as a part of the boxcar and tied in structurally with the side walls thereof. The inside faces of the fixed posts 9 and 10 may be provided with a series of clips 11 which have their bottom portions securely fixed by welding or the like to the posts and the top parts of which are offset outwardly to provide pockets and receive and are welded to the vertical flanges of the angle-shaped fixed wall members 13 which are welded to vertical posts (not shown) along the length of the car side walls. The wall members have horizontal flanges which contain perforations to receive downwardly extending pins on crossbars (not shown) also set forth in greater detail in the aforementioned patent. The fixed wall members 13 are located on a number of different levels and are commonly referred to as belts or rails. It will be appreciated that in order to support freight which happens to be transversely aligned with the doorway 3, the rails 13, or the equivalent thereof, will have to be extended to span the doorway 3. Doorway wall members 15 and 16 are shown in FIGURE 1 to illustrate such wall members. The wall members 15 and 16 are removable and enough of them will be provided to comprise extensions of all of the belt rails 13 that it is desired to use. The vertical flanges at the ends of the wall members 15 and 16 adjacent the fixed posts 9 and 10 removably seat in ends or pockets of clips 11.

Since the distance between the posts 9 and 10 is fifteen or sixteen feet, an unsupported wall member constructed to extend all of the way across the doorway opening 3 would have to be quite heavy if it were not to distort excessively under the loads applied to it. The removable vertical doorpost 19 is provided at an intermediate point between the fixed posts 9 and 10 to provide a support for the wall members 15 and 16 and to overcome the problem of a fifteen or sixteen foot span of unsupported wall member.

In order to support the removable doorpost 19 the original structure of the boxcar is modified to a slight extent as can be best seen in FIGURE 2. At the top of the door opening 3 the car structure includes a Z member 21 running lengthwise of the car. Welded to the inside face of the Z member 21 is a vertical plate 23 and it cooperates with the downwardly extending leg of the Z bar 21 to form a socket 25. The Z bar 21 also carries a Z-shaped door hood or retainer member 27. Beneath the top retainer 27 and in the space between it and the leg of the Z member 21 is disposed the angle-shaped door header member 31 which is rigidly affixed by riveting or welding to the downwardly extending leg of the Z member 21. The door 7 has portions 33 which fit inside of the pathway 37 formed by the top retainer 27 and a section 35 which fits on the outside and is sealed by suitable sealing means, to weatherproof the door even though it is movable. Along its bottom edge the doors are supported by suitable ball bearing devices 39 which roll on tracks 41, which in turn are supported by brackets 43 that are rigidly affixed to the fore and aft main stringers 45 of the boxcar. The door has suitable flanges 47 and 49 overlying the ball bearing device 39 to properly protect it from dirt. Supported on the longitudinal stringer 45 is a longitudinally extending angle member 51. Welded or riveted to the outer face of the member 51 is an angle member 53. Overlying the members 51 and 53 is a threshold plate 55 having an outer downwardly turned flange 57 and being supported additionally by a series of brackets 59 welded to the flange and to the bottom of the member 53. The wooden flooring 61 forming the floor of the boxcar is located between the flange on the bottom of the member 51 and the bottom surface of the threshold plate 55, as can be seen in FIGURE 2.

Normally the wood 61 would extend inwardly within the member 51 to the outside face 63. However, in accordance with the present invention, a hole 65 is cut in the threshold plate 55 and the wood located beneath this hole is removed to provide a socket 67 for the bottom of the removable post 19. Fitted in the socket 67 is a threshold box assembly 69 which has a top plate 71 with three openings 73, 74 and 75 formed therein, the center opening 74 being offset from a line through the centers of the side openings 73 and 75. Welded at right angles to the top plate 71 is a plate 77, the bottom edges of which are welded to the member 51, the top plate 71 being welded to the threshold plate 55 where the edges are adjacent. A reinforcing piece 79 is welded to the bottom of the plate 71 and provided with openings aligned with the aforementioned openings 73, 74 and 75. It will be seen that the threshold box 69 can be made up as a unit and then inserted into the socket 67 when the present freight bracing doorway construction is added to the freight car.

The top end of the removable post 19 extends through an opening 81 formed in a plate 83 that is welded across the bottom of the socket 25 as seen in FIGURE 2. The top of the bar 19 is substantially below the top portion of the socket 25 and the opening 81 is somewhat larger than the cross section of the top of the post 19. These features permit the post 19 to be readily lifted a substantial amount above the threshold plate 55 and tilted to an angle to enable the post to be removed from the socket 67.

The post 19 is preferably hollow and preferably has a cross section of the type seen in FIGURES 8 and 9. Thus, it may comprise a pair of facing channels 87 and 89. Between the legs of the channel 89 is welded a reinforcement plate 91 which preferably extends for substantially the full length of the combined channels. After this has been done the legs of the two channels are butted together and the channels welded together along the length thereof to provide a strong yet relatively lightweight construction. As can be seen in FIGURE 2, the channel 89 terminates somewhat below the channel 87 and an angle-shaped member 93 is welded to the top end of the channel 89 and to the legs of the channel 87 to form the reduced top portion of the bar 19 which extends through the opening 81. It will be noted that the heel of the angle member 93 is spaced a substantial distance below the plate 83, thus permitting the bar 19 to be lifted up a substantial distance into the socket 25.

In actual use of the boxcar embodying a doorway construction such as that already referred to, the shape of the door-way may actually change as a result of an impact to which the boxcar is subjected and this may cause the distance between the plate 83 and the threshold plate 85 to increase or decrease. It will be seen that such a change in dimension is accommodated by the slide fit of the top end of the bar 19 in the opening 83 and by the clearance space provided above it. Such loads on the freight cars are very sudden and may cause the bar 19 to have a tendency to jump out of the bottom socket 67. In order to prevent this, and also in order to lock the bottom of the bar 19 in place against movement about its axis or transverse movement, a latch assembly 101 is inserted into the bottom of the bar 19 and welded to the channels 87 and 89, the reinforcement plate 91 terminating at a point above the latch assembly 101. The latch assembly 101 is of a simplified construction which enables it to be inexpensively formed and assembled into the bottom end of the channels 87 and 89 and welded in place. Assembly 101 comprises a member 103 which has a relatively flat flange 105 which can be welded to the bottom of the channels and will form a closed piece for the bottom end of the post 19. Forged integrally with the section 105 are two downwardly extending conically pointed pins 107 which are spaced apart so that they will fit into the openings 73 and 75 in the threshold plate assembly. Between pins 107, there is an opening 109 for the downwardly extending movable pin 111 of a forged bell crank latch member 113, the pin 111 being conically tipped and arranged to extend through opening 74. The pin 111 is formed with an upwardly facing shoulder 115 and this is adapted to engage the under side of the plate 79 inwardly of the hole 74 so as to latch the post 19 to the threshold box assembly. Extending transversely from the pin 111 in the latch 113 is a handle section 117 which is urged to a horizontal position by a spring 119 confined between retainer projections 121 and 123 on the latch 113 and channel 89. The latch 113 is bifurcated at 125 to fit on opposite sides of support plate 126 and be pivoted thereon by pin 127. The plate 126 fits in slots 129 and 130 formed in the bases of channels 87 and 89, respectively, being welded to the inside of channel 87 and the outside of channel 89, as can be seen from FIGURES 3, 7 and 8. Enlarged openings 131 and 132 near the bottoms of channels 87 and 89 permit movement of the latch 113 and the plate 126 is formed on an angle as seen at 133 to permit this movement.

Opening 132 is disposed on the side of the bar 19 facing the doors 5 and 7 and it will be seen that when the auxiliary door 7 is opened it will be possible to lift the handle 117 so as to pivot the pin 111 in a counter-clockwise direction so as to remove the shoulder 115 from beneath the threshold plate, whereupon the member 19 can be lifted out of the socket 67 and removed from the socket 25, thus accomplishing complete removal of the door post. It will be observed that the axis of pivot provided by the trunnions 128 is so located with respect to a vertical line or plane through the shoulder 115 that loads on the shoulder 115 will not unlock the latch.

The inner face of the channel 87 is provided with a series of vertically spaced clips 151 which are in horizontal alignment with clips 11 and these will support the end of the removable wall members 15 and 16. Because of the heavy impact loads to which the freight car and its contents are subjected during use, there is a possibility that the bar 19 might be bent to such an extent that one or the other of the wall member 15 or 16 would drop out of their connections with the posts 9, 10 or 19 and fall to the floor, thus releasing the load. In order to prevent this and provide support for the post 19 against bending under such loads, one or the other of the bars 15 and 16 may be employed as a strut and used to support intermediate points of the post 19, preferably bar 16, in order to preserve the full width of the main doorway. Applicant has shown the bar 16 modified in such a way that it can be used at a point approximately at the center of the post but it will be realized that more than one such bar can be used if desired. The wall member 16 comprises an angle member 153 (FIGURES 6 and 10) having perforations in its horizontal flange. The back of the angle member 153 carries another angle member 155 which is welded to it and furnishes support for the angle 153 and also serves as a means for mounting latching devices at opposite ends. The wall member 15 may also be reinforced on its back by means of a similar angle 155'. The reinforcing angle 155 terminates at the point 157 and it will be seen that this is located short of the end 159 of the perforated angle 153. As a consequence, the horizontal flange of the angle 155 can bear against the post as seen at 161 in FIGURE 5 while the angle 153 can extend on the inner face of the post (as seen at 162) and fit in a clip 151 or 11. Welded to the vertical leg of the angle 155 in the corner thereof is a cylinder 163 in which is slidably mounted an angle-shaped latch pin member 165 which is spring pressed to a extended position wherein it will project into opening 167 formed in the side of the fixed or removable post and that will serve to prevent the member 15 or 16 from jumping out of the clips 11 and 151 as a result of sudden jolts on the boxcar. It will be noted that latch assembly 101 is of such a structure that it does not interfere with the use of holes 167 in the post 19.

In order to provide the aforementioned tie-in feature whereby the wall member 16 serves to transmit longitudinal loads from the post 19 to the post 10, and thus reinforce the post 19 and prevent bending thereof, applicant has provided the vertical plates 171 and 173 which are welded along their edges to the fixed post 10 and the removable post 19. The plates 171 and 173 have vertically extending slots 175 formed therein and these receive transversely extending pins 177 which seat in holes formed in the vertical flange of the angle 155 and are welded to such flange so that they are rigid with opposite ends of the wall member 16. The posts 177 extend through similarly shaped openings 179 in vertical plates 181 that are welded in a cut-out 183 formed in the horizontal flange of angle 155. It will be seen that the wall member 16 will act as a compression and tension strut carrying tension by means of posts 177 and compression by engagement of the horizontal and vertical end edges, as seen at 161, of angle 155 with the fixed post 10 or by engagement of the outside face of post 177 with the outer edge of slot 179, the compression engagement of the ends of angle 155 being the same as for compression strut 15. In this way the wall member 16 can take loads in either direction and transmit them directly into the fixed post 10 and thus reduce forces on the post 19 caused by fore and aft movement of the lading and make it possible to keep down the size and weight of removable post 19. The slots 175 are long enough to permit the member 16 to be lifted out of the pocket in which they are received in the clips 11 and 151.

In FIGURES 11 and 12 are shown a modified form of device for attachment to the ends of the wall member 16 to provide the just-mentioned tie-in feature and in this arrangement an angle 191 has been welded to the back of the perforated angle 153 which terminates short of the end of the angle 153 so as to provide the end portion 193 on angle 153 to seat in the clip 11 or the clip 151. Welded inside of the angle 191 is a forging 195 which has a central protuberance or post 197 corresponding to the post 177 and then arranged to project into the slots 175 in a plate 171 or 173. The forging 195 has two spaced legs 199 which are provided with aligned openings through which the angle-shaped latch pin 201 slidably extends. A spring 200 is confined between the outer leg 199 and a cross pin 203 on the latch pin 201 and will thus urge the latch pin to an extended position wherein it will project through an opening in the wall of the post member. In the arrangement of FIGURES 11 and 12 it will be seen that the projection 197 will bear against one or the other vertical sides of the slot 175 to transmit loads into the plate 171 or 173.

In FIGURES 13 and 14 a modified means is shown for attaching the removable door post to the threshold plate. This door post will carry clips 151 and holes 167 in the side similar to the holes shown on the removable post 19 so that it can support the wall members 15 and 16 in a removable fashion. It may also include as a part thereof a side plate (such as 173) so that it can be tied in to the fixed post by means of one of the wall members as previously described. The removable post 251 is rotatable in order to lock it in place or to remove it so it contains no moving parts. At the bottom of the channels 253 and 255, which are welded together to form the hollow post body, there is welded a forging 257 which has a flat portion constituting the bottom plate 259 for the post body. As a part of the forging 257 there is a circular downwardly extending centering stud 261 and projecting transversely from one side thereof is an ear or shoulder 263 which is spaced below the bottom of the plate portion 259. Also formed integrally with the forging 257 is an upwardly extending flange 265 which is spaced outwardly from the face of the channel 253 so that it will form a pocket for the wall member angle section 153, the section 265 thus corresponding to the clip 151, it being appreciated that there will be clips 151 spaced on the front face of the channel 253 at suitable levels above the flange 265.

A latch plate 267 is welded on the threshold plate 55 or, if desired, the latch plate 267 may be built up in the manner already described in connection with the first embodiment. The latch plate 267 has a keyhole slot formed in it which consists of a circular central section 269 and a transverse slot portion opening into it, the slot 271 extending inwardly with respect to the car side wall. The slot 271 is slightly larger than the ear 263 so that when the post is rotated 180° from its position in FIGURE 13, the ear 263 will drop through the slot 271 to a position beneath the plate 267 whereupon the post can be rotated 180° to swing the latch ear 263 to the position shown in FIGURES 13 and 14, wherein it lies under the plate 267 and thus latches the post 251 in place.

At the top of the post 251 there is welded a round pipe or bar 269 which is coaxial with stud 261 and this will extend through an aligned opening of somewhat larger diameter into the socket 25 through a suitable plate corresponding to the plate 83 of FIGURE 2.

It will be seen from FIGURE 14 that the post 251 is kept from rotating while in use by the wall members 16 and 15. The back of the angle 153 engages the front of the channel 253 while the end edge 161 of the angle 155 will engage the side of the channel 253 and will do so at a point beyond the center of rotation, that is, the center of the projection 261. Thus, the corner defined by the angles 153 and 155 will serve effectively to prevent the post 251 from rotating to an unlatched position and it will be seen that the vertical leg of angle 153 in conjunction with clip 151 and also the pin 165 in hole 167 will act to prevent rotation.

FIGURES 15 and 16 show one method of attaching the fixed clip 151 to the doorpost 19 or 251. The body of the clip 151 can be formed as a forging with side flanges 271 and an offset to provide the pocket 273. They can also be formed with a pair of pins or projections 275 to extend through holes 277 drilled in the web of the channel such as the channel 253. The pins 275 are then deformed or headed after they have been extended through the holes and they will act in combination with the lip 279 of the body of the clip to support the clip.

FIGURES 17 and 18 show another form of latching means for the removable post arranged to provide a rotatable post with no moving parts. In this embodiment the post 301 may be made up of channels 303 and 305 which are welded together along their adjacent edges to form a hollow tube. The bottom of the post 301 is provided by a forging 307 which includes a bottom plate 309 that is welded to the bottom of the channels 303 and 305. The forging 307 includes a downwardly extending projection 311 that has an opening 313 formed therein and a large transverse ear 315 and a smaller transverse ear 317 located on radially opposite sides, the difference in size insuring proper angular position of the post when it is dropped in its socket. The ears 315 and 317 will fit below and engage the bottom surface of the reinforcement plate 319 that is welded in the socket 67 beneath the threshold plate 55. A keyhole slot is formed in the two plates so that the ears 317 and 315 can be dropped down into the socket 67. The slot 321 for the small ear is smaller than the slot 323 for the larger ear 315 so it will be seen that the removable post can be inserted in only one position. As soon as the post 301 is inserted into the socket 67 a stud 325 welded to a cross plate 327, which in turn is fixed in place in the socket below the plate 319, will enter the hole 313 and act to properly center the post. After the projections 315 and 317 have been projected through the slots 323 and 321, respectively, the post is rotated 90° in a clockwise direction until the projection 317 abuts the edge of a stop 329 provided on the bottom of plate 319, at which time the post is properly positioned with the clip or flange 333, formed as a part of base 307, located on the inside of the post and located to form a pocket to receive a removable wall member 15 or 16. The other end of stop 329 locates the post in proper position for removal by abutment with ear 315. It will be appreciated that, as in the preceding embodiment, the wall members will serve to prevent rotation of the removable post 301 about its bottom end 311 and a top projection (such as 269 of FIGURE 17) since the axis of rotation thereof is located adjacent to the pocket formed by flange 333 and the end edge of the wall member will be over center with respect to the axis of rotation. The stop 329 also insures insertion of the post in only the proper angular position.

As a further means to prevent undesired rotation and also as a means to stiffen the door and to prevent closing of the auxiliary door unless the post 301 is in proper rotative position, a handle 335 is welded to the channel 305 at a convenient height, such as three to four feet, and projects transversely to extend through a hole 337 formed in a flange 339 on a stiffener 341 which is a part of the door 7 or, the equivalent could, of course, be added to the door. It can be seen that as the door slides into position, the hole 337 will not fit over the handle 335 unless the removable post 301 is in its proper position. Further, if the bar is rotated to the removal position (90° counterclockwise from FIGURE 17) or less, the edge thereof will engage flange 339 or other part of the door 7 to prevent complete closing of the door. The post 301 will also act to stiffen the door 7 and will be assisted in this by the wall member 15 or 16 attached to it. Contrariwise, it will be seen that the door will take rotational loads on the post 301 and also transverse loads on the post through the handle 335 and also by abutment of the side of the post with flange 339. It will also be observed that by using the handle 335 in hole 337 it is possible to eliminate ears 315 and 317 since the handle will keep the post from jumping out of socket 67. It will be appreciated that the handle 335 acts as a convenient means to lift and turn the post 301 and that the mouth 343 formed at the inner edge of the door 7 is adapted to engage with the main door in a suitable manner.

In FIGURES 19 to 23 applicant shows another form of removable wall member. The removable wall members 401 shown in these figures are illustrated as having a channel 402 on the inner face thereof, each of the flanges 403 of which are provided with perforations 405 adapted to receive pins on crossbars of the type referred to in the aforementioned patent. It will be understood that instead of the channels 402, the locking and support mechanism for the wall member could just as well be attached to the back of an angle such as shown in connection with the wall members 15 and 16. On the back of the channel 402 is affixed, by welding or other suitable means, another and somewhat smaller channel 407 which acts as a lightweight reinforcement for the bar. The wall member 401 has a fixed pin device 409 at one end containing pins adapted to fit in holes 411 in the removable post 413 or fixed posts 9 and 10. The removable post 413 may be of any suitable construction, but preferably of the type described elsewhere herein. The fixed pin device 409 comprises a transverse plate 415 which is cut out at 417 to form shoulders fitting on the top and bottom of the channel 402 so that the plate 415 can be properly located on the channel and welded to it. The plate 415 has a pair of apertures 419 formed therein and at a subassembly operation, a pair of pins 421 each having flanges 423 are inserted into the holes 419 and then the ends thereof swaged over to form the heads 425 whereby the pins are firmly secured to the plate 415. The plate 415 is located a substantial distance inwardly from the end of the channel 402 so that when the pins 421 extend in holes 411, the channel 402 will engage the inside face of the post 413.

The other end of the member 401, and preferably the end which is attached to either the fixed post 9 or the fixed post 10, has a sliding pin locking device 431. This comprises a channel-shaped member 433 which is welded to the back of the channel 402 and to the end of the second channel 407. The channel 431 has the two flanges 435 and 437. At an intermediate point a face plate 439 is welded to the channel 433 and the channel is notched out on top and bottom as shown at 441 so that extensions 442 on the top and bottom of the plate 439 can project over and engage the top and bottom flanges of the channel 402 to properly locate the assembly of channel 433 and plate 439 in position at assembly. The plate 435 has a pair of apertures 445 formed therein and in alignment with these are keyhole apertures 447 in the plate 439. The apertures 447 have flat slots or non-circular portions extending horizontally as seen at 449. The flat portions 449 receive flanged ears 451 swaged on the shanks 453, having pin ends 455, of angle-shaped lock handles, the shanks extending through apertures 445 and into the openings 411 in the posts 9 and 10. It will be seen that by raising the handle portion 457 the ears 451 will be brought into alignment with the flats 449 so that the pin end of the shank 453 can be retracted to withdraw the end 455 from the holes 411 and thus permit the bar to be disconnected. Complete removal of the pins 455 is prevented by the flange 437 which engages the handle portion 457. It will be seen that gravity alone will cause the handle 457 to drop downwardly, thus bringing the ears 451 to a vertical position so that the pins cannot be withdrawn and will remain in the locking position. A unique feature is shown in FIGURE 20 wherein the inside surface of the door 7 or 5 will be close enough to the handle 457 so that the latter cannot be pivoted upwardly when the doors are closed a sufficient amount to permit the ears 451 to become aligned with slots 449 and thus, so long as the doors remain closed, the wall member 401 cannot be removed from the post since pin ends 455 cannot be withdrawn. Contrariwise, the ears 451 are long enough so that if the pins 455 are not fully inserted into holes 411, the handle will project out from the car since the ears will be in slots 499 and prevent closing of the door. The pins 455 and 421 project a sufficient distance beyond the ends of the wall members so that the pins are long enough to accommodate deflection of the post or deformation of the car frame itself without danger that the wall member will drop out. It will be observed that the wall members 401 act as compression struts to support side loads on the removable post 413.

It will be realized, of course, that the bar 401 could be used in a single doorway car, that is, one in which no removable post is used, and in this case it would be preferable to employ a locking device 431 at each end so that the bar 401 can be removed from the outside of the car by taking it directly out without tilting or twisting to get a projecting end out from behind the post. However, if desired, it is clear that in a single door car, the bar 401 may be as described, i.e., with the fixed pin device 409 at one end.

It will be appreciated that holes 411 could be made like holes 449 and ears 451 provided on the ends of the pins 455 to lock on the inside of the fixed post 10, if desired, and thus transmit tension loads into the post, compressive loads being transmitted by flange 435. In this case, gravity locking and safety prevention of door closing when unlatched, would take place as described above.

In FIGURES 24 to 28 is illustrated another form of locking device 501 for a wall member 503. This locking device is adapted to be removably connected to the fixed door posts 9 and 10 in such a way that the wall member 503 does not move relatively to them. The other end of the wall member 503 contains a pin mounting device such as already described in connection with either end of the preceding embodiment of FIGURES 19 to 22, so that the movable post can bend or deflect relatively to the wall member 503 and also, so that longitudinal loads on the wall member 503 will be transmitted into the fixed posts rather than into the removable post. The wall member 503 comprises a channel 505 having upper and lower flanges 507 with holes 509 punched therein whereby they may receive and support the ends of crossbars. Mounted on the back of the channel 505 are two sets of plungers. The first set comprises the outer plungers 511 which are welded to cross plates 513 and 515. The plungers 511 are guided by apertures 517 in a plate 519 which is welded to the back of the channel 505 near its outer end. The plungers 511 also slidably extend through suitable apertures in plates 521 and 523. The ends of the plungers 511 are conically tipped to facilitate entry into the holes 525 (i.e., the same as holes 167) in a side of the fixed wall member 9 and inwardly of the conical ends are provided with notches 527 which are of a width adapted to fit over the thickness of the wall 529 of the member 9 whereby the plungers are locked to such wall.

Figure 28:
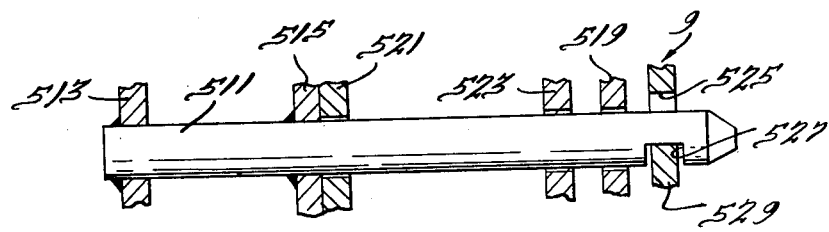
FIGURE 28 is a cross section taken along the line 28—28 of FIGURE 24.

The other set of plungers comprises the members 531 which are welded to a plate 533 and to the plate 523 and slidably extend through suitable apertures in the plates 515, 521 and 519 and through apertures 525 in the wall 529 of the fixed post. It will be observed that the axes of the plungers 531 are offset from the axes of the plungers 511 and it will be evident that after the plungers 511 have been inserted in holes 525 the insertion of plungers 531 into other holes 525, which is facilitated by their conical tips, will force the wall member 503 to move sideways a slight amount so that the notches 527 will engage the edges of the holes 525 as seen in FIGURES 25 and 28.

The plungers 511 can, of course, be moved by shifting the plate 513 or the plate 515. The plungers 531 are moved by means of a lever 541 which has a handle portion 543 lying between plate 513 and plate 533. The handle 541 has a shank 545 which is axially secured to the plate 523 by collars 547 which are affixed to the shank 545 by cross pins 549. Thus, when the lever 541 is pushed in one direction or another, it will act through the pins and collars 547 to move the plate 523 and thus move the plungers 531.

When the two sets of plungers are in a fully retracted position the plate 513 will bear against a stop 551 and the handle 541 will lie in a plane at right angles to the channel 505 and seat in slot 553. In this position only the conical tips of the plungers 511 will extend beyond the fixed plate 519. With the locking device 501 in this position the other end of the member 503 can be inserted in the removable door post. This other end is not shown in FIGURES 24 to 28 but, as indicated above, may be the same as the structure described in the preceding embodiment. In order to latch the wall member 503 to the post 9 or 10, the first step is to position plate 513 so that the plungers will enter the holes 525. The late 513 can be positioned until plate 515 engages plate 521 which is welded to the back of the channel 505. After this has been done, only the conical tips of the plungers 511 will project beyond the end of the plate 519 and the handle 541 will still be in a vertical position and in the slot 553. It will be observed that the plate 513 cannot be so moved when the handle 541 is in the position shown in FIGURE 24, i.e., in a plane parallel to the back of the channel 505. In order to cause the plungers 531 to enter openings 521, the handle 541 is moved toward the fixed post. When this is done, the plate 523 will be moved, carrying with it the plate 533 and movement will continue until the plate 533 engages the plate 515. At this point the handle 541 will be out of the slot 553 and in the position shown in FIGURE 24 so that gravity will rotate it to the position shown in full lines and the bar will be locked in position. As in the preceding embodiment (especially FIGURE 20), the closed door will serve to hold the handle portion 543 in the locked position and the door cannot be closed with the bar in the unlocked position since the handle 541 will be held out in the path of the door by slot 553.

What is claimed is:

1. In a removable vertical post for the doorway of a freight car or the like, an elongated body having a fixed pin extending parallel to its length projecting from the bottom end, said body having a pair of opposed sides each having a plurality of apertures spaced longitudinally thereof adapted to receive attachment means of associated wall members, means disposed intermediate and in spaced relation to said sides and between and in spaced relation to said apertures and providing a centrally located pivot surface adjacent the bottom end, said apertures extending axially along said body member throughout at least a portion of the axial length thereof throughout which said means providing said pivot surface extends, a movable pin pivotally mounted on said surface to swing about an axis transverse to the length of the bar, said movable pin having a latch shoulder facing the end of the bar, and handle means connected to the movable pin and extending transversely to the length of the bar and accessible from the outside thereof and providing means for manually pivoting said movable pin.

2. The invention set forth in claim 1 including a fixed plate located parallel to said opposite sides and substantially on the midplane of the body, a pivot pin connecting said movable pin to said plate, and a spring between said body and said movable pin to urge the movable pin to a latching position, and a bottom for the body comprising a member including said fixed pin as a part thereof.

3. In a doorway construction for a railroad boxcar, means providing a socket open on the bottom on the top of the doorway of the boxcar, means providing a socket aligned with said top socket in the sill of the doorway and covered with a plate having an opening therein, a removable and rotatable door post having a portion adapted to freely extend into said top socket and an aligned portion at its bottom end adapted to project through said opening in said plate and including latch means including a laterally projecting ear movable through said opening upon movement of said post relative to said plate when said post is in a first rotative position relative thereto and adapted after such movement through said opening and after rotative movement of said post to a second position relative thereto to engage the plate to prevent upward movement of the post relative to the plate.

4. In a wall member to be attached to a vertical member, a pair of fixed pins carried at one end of the wall member, a U-shaped member at the other end of the wall member, said U member having legs extending transversely outwardly from the wall member and having its base affixed to the wall member, a plate secured to said U-shaped member and located at an intermediate position between said legs and parallel thereto, said plate having ears extending into notches provided in a portion of the base of the U member and adapted to locate the plate on the U-member, said plate having a pair of keyhole slot openings therein, one of said legs on the U member having a pair of openings in alignment with the keyhole slot openings, and angle-shaped handle members having shanks slidably supported in said openings and having ears adapted to fit in said keyhole slot openings, said handle members being movable between extended positions in which said shanks are adapted to engage and support said wall member on an associated post and retracted positions in which said shanks are not adapted for such support, said ears on said shanks being so disposed that upon movement of said handle members from said retracted positions to said extended positions they are moved through and out of said keyhole slot openings in said plate so that the handle members may be rotated in said slot openings after which said ears will engage said plate to prevent inadvertent withdrawal of said handle members to said retracted positions.

5. In a crossbar supporting device adapted to be connected to a post having a wall having a plurality of holes spaced therealong, an elongated member for attachment to a crossbar, a pair of plates secured to the back of said member, said plates being spaced apart lengthwise of the member, a first pin slidably mounted in aligned first apertures in said plates, a second pin parallel to the first and slidably mounted in aligned second apertures in said plates, said first apertures and said second apertures being spaced different distances from the back of said wall member, said first apertures being closer to said wall member, said first pin having a notch cut in the side thereof adjacent the end thereof, means for moving said first pin lengthwise of said member to move said first pin into one of said holes and align said notch with said wall, means for moving said second pin lengthwise of the members to move said second pin into another of said holes in said post, cam means on said second pin co-operable with said post during slight movement of said second pin to move said member relative to said post so as to move said first pin to engage said wall in said notch, and means for latching said pins in a position wherein said notch engages said wall at the edge of said first named hole in which said pin projects.

6. In a freight supporting element, an elongated body, means for removably affixing said body to a support member, said means comprising a pair of plates affixed to the back of said body, a first pair of pins movably mounted in aligned apertures in said fixed plates and having notches at one side thereof for receiving a wall portion of an associated post to which the element is connected, a pair of plates rigidly secured to said pins and extending transversely thereof, a second pair of pins disposed in a plane in spaced parallel relation to the plane of said first pair of pins and projecting through aligned holes in said fixed plates and adapted to be moved into apertures in said post, a pair of plates extending transversely to said second pins and rigidly secured thereto, cam means on said second pins co-operable with said post to cam said element laterally to move said notches of said first pins over said wall portion of said post to lock said first pins to said wall portion of said post and handle means for moving said second plates, one of said second plates having abutting engagement with one of said plates of said pair of plates secured to said first named pair of pins and acting to move said first pin, said handle means being pivotal and movable by gravity to a position between certain of said plates to hold said second pins against inadvertent withdrawal.

7. In a doorway construction for a railroad boxcar as defined in claim 3, a fixed doorway post disposed in spaced parallel relation to said removable doorpost, a removable wall member extending between said posts when said removable post is in said second position, and co-operating means on said wall member and said posts removably connecting said wall member to said posts so that said wall member holds said removable post against rotation from said second position.

References Cited in the file of this patent
UNITED STATES PATENTS

| | | |
|---|---|---|
| 1,639,009 | Singley | Aug. 16, 1927 |
| 1,735,800 | Snyder | Nov. 12, 1929 |
| 1,819,978 | Shur | Aug. 18, 1931 |
| 2,091,869 | McCurdy | Aug. 31, 1937 |
| 2,268,394 | Herbert | Dec. 30, 1941 |
| 2,287,852 | Zyara | June 30, 1942 |
| 2,467,681 | McKinney | Apr. 19, 1949 |
| 2,497,683 | Nampa et al. | Feb. 14, 1950 |
| 2,514,229 | Fahland | July 4, 1950 |
| 2,593,174 | O'Dell | Apr. 15, 1952 |
| 2,616,375 | Nampa | Nov. 4, 1952 |
| 2,710,212 | Larimore | June 7, 1955 |
| 2,808,789 | Stough | Oct. 8, 1957 |
| 2,826,388 | Janos et al. | Mar. 11, 1958 |
| 2,827,960 | Keating et al. | Mar. 25, 1958 |
| 2,834,304 | Chapman et al. | May 13, 1958 |
| 2,873,695 | Tobin | Feb. 17, 1959 |
| 2,901,987 | Campbell et al. | Sept. 1, 1959 |